United States Patent
Lidow et al.

(10) Patent No.: US 11,544,747 B2
(45) Date of Patent: Jan. 3, 2023

(54) COST-PER-VIEW AND COST-PER-IMPRESSION BIDS ON A SINGLE IMPRESSION

(71) Applicant: Xandr Inc., New York, NY (US)

(72) Inventors: Arel Ives Lidow, New York, NY (US); Charles Brian O'Kelley, New York, NY (US)

( * ) Notice: Subject to any disclaimer, the term of this patent is extended or adjusted under 35 U.S.C. 154(b) by 575 days.

(21) Appl. No.: 14/745,844

(22) Filed: Jun. 22, 2015

(65) Prior Publication Data

US 2016/0371745 A1 Dec. 22, 2016

(51) Int. Cl.
*G06Q 30/02* (2012.01)

(52) U.S. Cl.
CPC ................. *G06Q 30/0275* (2013.01)

(58) Field of Classification Search
None
See application file for complete search history.

(56) References Cited

U.S. PATENT DOCUMENTS

| | | | | |
|---|---|---|---|---|
| 8,131,594 | B1* | 3/2012 | Yehoshua | G06Q 30/02 705/14.53 |
| 2003/0036949 | A1 | 2/2003 | Kaddeche et al. | |
| 2009/0234711 | A1 | 9/2009 | Ramer et al. | |
| 2010/0125506 | A1 | 5/2010 | Vassilvitskii et al. | |
| 2011/0191168 | A1* | 8/2011 | Schroedl | G06Q 30/0256 705/14.54 |
| 2012/0036024 | A1* | 2/2012 | Mysen | G06Q 30/08 705/14.71 |
| 2012/0310729 | A1* | 12/2012 | Daito | G06Q 30/02 705/14.43 |
| 2013/0268351 | A1 | 10/2013 | Abraham et al. | |
| 2014/0136342 | A1* | 5/2014 | Ringdahl | G06Q 30/0273 705/14.71 |
| 2014/0278981 | A1* | 9/2014 | Mersov | G06Q 30/0255 705/14.53 |

(Continued)

FOREIGN PATENT DOCUMENTS

CA  2750700 A1 * 8/2010 ......... G06Q 30/0242

OTHER PUBLICATIONS

"Speculative execution", Wikipedia, archived on Jan. 30, 2014, https://en.wikipedia.org/w/index.php?title=Speculative_execution&oldid=593080954.*

(Continued)

*Primary Examiner* — Kambiz Abdi
*Assistant Examiner* — Scott Snider
(74) *Attorney, Agent, or Firm* — Calfee, Halter & Griswold LLP (57) ABSTRACT

Methods, systems, and apparatus, including computer programs encoded on a computer storage medium, for receiving, from a client device, an ad request for an ad space being for presentation in a user interface of an application on the client device, sending, to bidder systems, a bid request on the ad space, receiving bids from the bidder systems, selecting, from the received bids, a cost-per-view bid corresponding to a first creative and a cost-per-impression bid corresponding to a second creative, and sending a message to the client device wherein the message comprises respective identifiers of the first and second creatives, and wherein the client device is configured to obtain the first creative and present the first creative in the ad space if the ad space is in view one the client device within a specified time period.

20 Claims, 3 Drawing Sheets

(56) References Cited

U.S. PATENT DOCUMENTS

| | | | | |
|---|---|---|---|---|
| 2015/0051968 | A1 | 2/2015 | Sotelo et al. | |
| 2015/0051986 | A1 | 2/2015 | Saifee et al. | |
| 2015/0149304 | A1* | 5/2015 | Whelan | G06Q 30/02 705/14.73 |
| 2015/0154650 | A1* | 6/2015 | Umeda | G06Q 30/08 705/14.68 |
| 2016/0180374 | A1* | 6/2016 | Cetintas | G06Q 30/0244 705/14.43 |
| 2017/0140421 | A1* | 5/2017 | Filev | G06Q 30/02 |

OTHER PUBLICATIONS

Tompsett, Adrian, "Introducing 'vCPM': The Right Way to Think About Viewability", Ad Exchanger, Jan. 21, 2013, https://web.archive.org/web/20131225033217/https://www.adexchanger.com/data-driven-thinking/introducing-vcpm-the-right-way-to-think-about-viewability/ (Year: 2013).*

Deepak Agarwal, Bo Long, Jonathan Traupman, Doris Xin, and Liang Zhang. 2014. LASER: a scalable response prediction platform for online advertising. In Proceedings of the 7th ACM international conference on Web search and data mining (WSDM '14). (Year: 2014). Association for Computing Machinery, New York, NY, USA, 173-182. https://doi.org/10.1145/2556195.2556252 (Year: 2014).*

U.S. Appl. No. 14/685,919, filed Apr. 14, 2015, Cost-Per-View Advertisement Bidding, Lidow.

U.S. Appl. No. 15/180,913, filed Jun. 13, 2016, Online Ad Auction Based on Predicted Ad Space View-Ability, Shah, et al.

U.S. Appl. No. 14/746,288, Advertisement Space Auction Allowing for Secondary Auctions, filed Jun. 22, 2015.

* cited by examiner

COST-PER-VIEW AND COST-PER-IMPRESSION BIDS ON A SINGLE IMPRESSION

BACKGROUND

This specification relates to online advertising, and more particularly, to advertisement space auction and payment.

Online display advertising delivers promotional messages to consumers by using visual advertisements (or "ads") in web pages. A publisher of a web page can insert an ad space in a web page. An ad space is a region of a web page (or other electronic document) where an advertisement can be placed. When the web page is displayed in a browser, a visual advertisement (a "creative") of an advertiser can be dynamically retrieved from an ad server for the advertiser, and displayed in the ad space. The act of serving a creative on a web page for displaying is often referred to as an impression.

An ad space inventory is a collection of one or more ad spaces on web pages served by a publisher's web sites. Publishers can sell their ad space inventories to advertisers. Multiple publishers and multiple advertisers can participate in auctions in which selling and buying of ad space inventories take place. Auctions can be conducted by an ad network or ad exchange that brokers between a group of publishers and a group of advertisers.

Selling and buying ad spaces can be based on pricing or payment models such as cost per thousand impressions (CPM), cost per view (CPV), cost per click (CPC), and cost per action or acquisition (CPA). In the CPM model, advertisers typically pay for every impression of their advertisement; the price paid for each impression is measured in price per 1000 ("mille") impressions. In the CPV model, advertisers typically pay each time their advertisement is viewed. In the CPC model, advertisers typically pay each time a viewer clicks on their advertisement. In the CPA model, advertisers pay for every action, such as a sale or registration, completed as a result of a viewer clicking on their advertisement.

SUMMARY

In general, one aspect of the subject matter described in this specification can be embodied in methods that include the actions of performing by one or more computers: receiving, from a client device, an ad request for an ad space being for presentation in a user interface of an application running on the client device, sending, to one or more bidder systems, a bid request for bidding on the ad space, receiving bids from the bidder systems, each bid corresponding to a respective buyer, a respective creative, and a respective bid price, selecting, from the received bids, a first bid and a second bid, the first bid corresponding to a first buyer, a first bid price, and a first creative, the first bid being a cost-per-view bid wherein the first buyer pays only if the first creative is viewed, the second bid corresponding to a second buyer, a second bid price, and a second creative, the second bid being a cost-per-impression bid wherein the second buyer pays if the second creative is served, and sending a message to the client device wherein the message comprises respective identifiers of the first and second creatives, and wherein the client device is configured to obtain the first creative and present the first creative in the ad space if the ad space is in view on the client device within a specified time period. Other embodiments of this aspect include corresponding systems, apparatus, and computer programs.

These and other aspects can optionally include one or more of the following features. The aspect can further comprise receiving, from the client device, a first confirmation that the first creative was presented in the ad space, and recording a first transaction amount payable by the first buyer, the first transaction amount being based on the first bid price. The client device can be further configured to obtain the second creative and present the second creative in the ad space if the ad space is not in view on the client device within the specified time period. The aspect can further comprise receiving, from the client device, a second confirmation that the second creative was presented in the ad space, and recording a second transaction amount payable by the second buyer, the second transaction amount being based on the second bid price. Selecting the first bid can further comprise determining a historical viewing rate of an ad space inventory including the ad space, adjusting the first bid price based on the historical viewing rate, and selecting the first bid based on the first bid price as adjusted. The first bid price can be the highest bid price among bids received by the auction system, the second bid price can be the highest bid price among cost-per-impression bids received by the auction system, and the first bid price can be higher than the second bid price. The message can further comprise the specified time period.

Particular implementations of the subject matter described in this specification can be implemented to realize one or more of the following advantages. The system described herein conducts an auction on an ad space by accepting cost-per-view and cost-per-impression bids. The system selects a cost-per-view bid and a cost-per-impression bid on the space, and deliver respective creatives of both selected bids to the ad space. If the creative of the selected cost-per-view bid is not viewed within a specified time period, the creative of the selected cost-per-impression bid is served to the ad space instead. In this way, the ad space's seller can receive payment, either from the buyer of the selected cost-per-view bid, or from the buyer of the selected cost-per-impression bid. The seller thus does not take on a risk of accepting a cost-per-view bid but not being able to receive payment from the cost-per-view bid's buyer because the cost-per-view bid's creative is not viewed.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
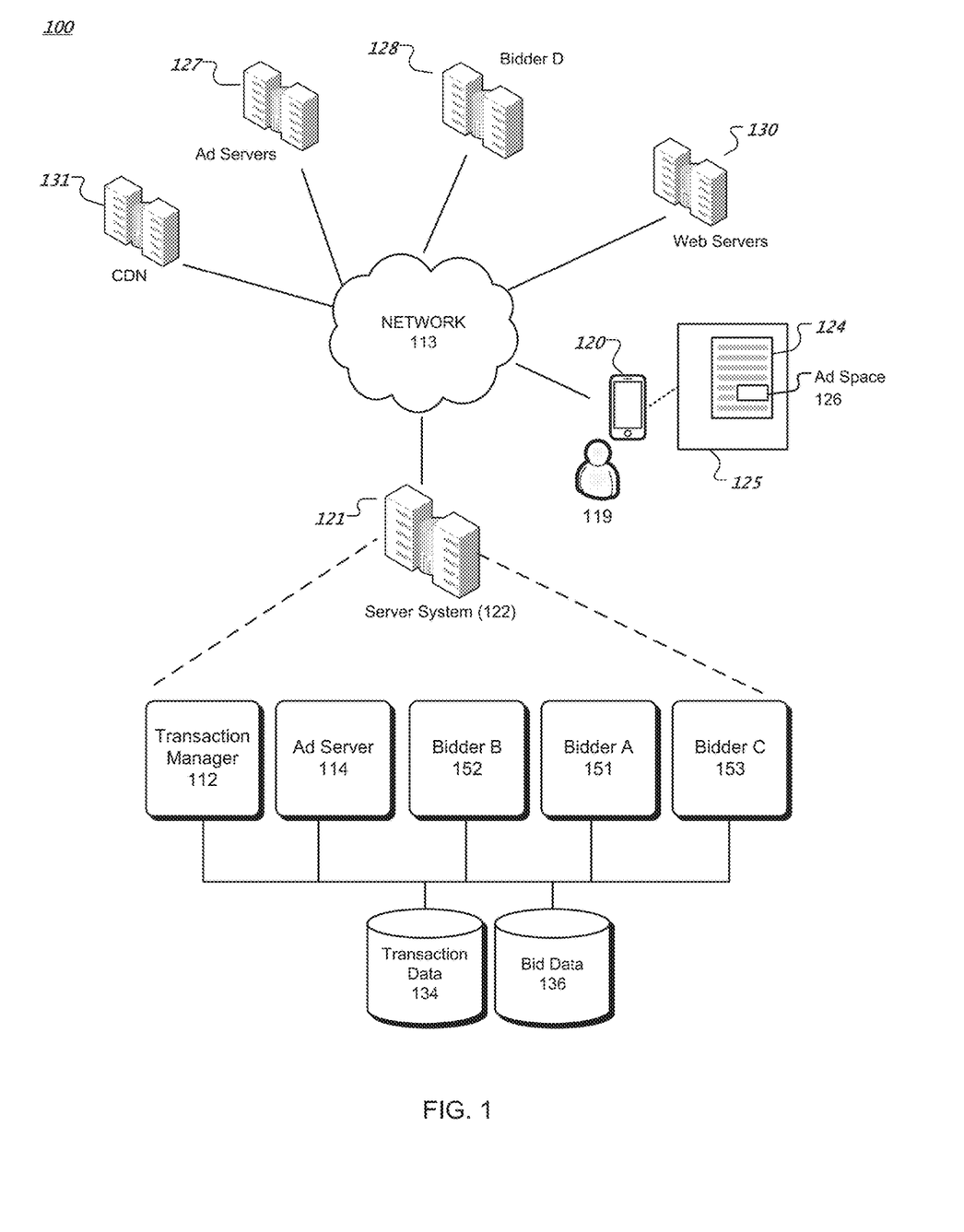
FIG. 1 illustrates an example system for ad space auctions.

FIG. 1 illustrates an example system 100 for ad space auctions. A server system 122 provides functionality for real-time ad space data auctions. The server system 122 comprises software components and databases that can be deployed at one or more data centers 121 in one or more geographic locations, for example. The server system 122 software components comprise a transaction manager 112, ad server 114, and one or more bidders (e.g., bidder A 151, bidder B 152, and bidder C 153). The server system 122 can also include one or more software components for load balancing tools and security tools. The load balancing tools manage traffic within a single data center or between multiple data centers. The security tools manage data protection and access privilege for tenants served by the data centers 121. The software components can comprise subcomponents that can execute on the same or on different individual data processing apparatus. The server system 122 databases comprise a transaction data database 134 and bid data database 136. The databases can reside in one or more physical storage systems. The software components and databases will be further described below.

The transaction manager 112 ("impression bus" or simply "Imp Bus") is an auction system that facilitates the transaction aspects of ad space inventory and impression trading between buyers and sellers. A buyer can be an advertiser (e.g., a credit card company, a sportswear company), an ad network, or an advertising agency, for example. Other buyers are possible. A seller can be a publisher (e.g., newspaper or social network), an online streaming or gaming service, or an ad network. Other sellers are possible. The transaction manager 112 processes ad requests received from web browsers or other software applications displaying content from publishers, sends relevant information to advertisers, conducts auctions (e.g., on behalf of sellers), returns creatives to the browsers or other applications, keeps track of billing and usage for advertisers and publishers, returns auction-result data, and enforces quality standards, for example. The transaction manager 112 stores in the transaction data database 134 various transaction information for each ad space that is transacted by the transaction manager 112 or other software components of the server system 122.

The ad server 114 is a software component that serves creatives to web pages or other applications. The ad server 114 can also make decisions about what creatives to serve, and track clicks or other user interactions with creatives, for example. A creative can be a visual or audio advertisement such as an image, an animation, a video clip, or an audio clip. Other types of a creative are possible.

A bidder system or bidder (e.g., bidder A 151) is a software component that, on behalf of a buyer, performs bidding operations. The bidder takes various pieces of bid-specific information (e.g., maximal bid price, target user areas or segments, start and end dates, budget) as input and generates a bid for a particular item of an ad space inventory, for example. A buyer can set up, e.g., through an Application Programming Interface (API) or web pages provided by the server system 122, a campaign targeting an ad space inventory with a set of bid-specific information for the ad space inventory and store the bid-specific information in bid data database 136. In some implementations, a bidder can be remote from the server system 122, such as bidder D 128. Here, an ad space inventory can be a collection of one or more ad spaces on web pages served by a publisher's web site. An ad space inventory can also be a collection of one or more ad spaces in graphical user interfaces of software applications other than web browsers published by a publisher. Other collections of ad spaces of an ad space inventory are possible.

The transaction manager 112 conducts an auction when receiving an ad request for filling an available ad space. By way of illustration, a graphical user interface 124 of a software application 125 executing on client device 120 of a user 119 can include an ad space 126 and a corresponding ad tag. The application 125 can be a web browser application, or a software application such as a game application or a maps application. For instance, a web page displayed in a browser window of a web browser (e.g., running on a personal computer) can include an ad space on the web page and a corresponding ad tag. By way of illustration, the ad space can appear at the bottom of the user interface (a "banner ad") with a corresponding ad tag. Other examples of ad spaces are possible. Here, the client device 120 can be a mobile phone, a smartwatch, a tablet computer, a personal computer, a game console, or an in-car media system. Other examples of a client device are possible.

In some implementations, an ad tag comprises a Uniform Resource Locator (URL) from which an ad will be requested (e.g., a URL for the server system 122), Hypertext Markup Language (HTML) statements and/or JavaScript instructions for retrieving and displaying a creative (e.g., displaying the creative in a 160×600 iframe). The application 125 running on the client device 120 can retrieve content in the user interface 124 (e.g., a web page) through one or more data communication networks 113 such as the Internet, for example, from web servers 130 of a publisher. The ad tag causes the application 125 to send (e.g., through the networks 113) an ad request ("ad call") to the server system 122. In some implementations, the application 125 sends an ad request to the server system 122 via another advertising server system such as an ad exchange. The ad request can include information about the available ad space 126 (e.g., a size for the ad space, an identifier for the publisher), user information (e.g., an identifier of the user 119, an Internet Protocol or IP address), and system information (e.g., types of the browser and the client device), for example. The ad request can be composed in JavaScript Object Notation (JSON) or Extensible Markup Language (XML) format and transmitted to the server system 122 using Hypertext Transfer Protocol (HTTP) protocol (e.g., using HTTP POST request method). Other ad request formats and transmission methods are possible.

In response to the ad request, the transaction manager 112 generates a bid request including information about the ad space, the user, and so on, and sends the bid request to multiple bidders such as bidder A 151 and bidder B 152. The transaction manager 112 can also send the bid request through the networks 113 to servers of bidder D 128, which is external to the server system 122. The bid request can be composed in JSON format and sent to bidders using HTTP POST. The bid request can also be encoded or compressed. Other bid request formats and transmission methods are possible.

Each bidder can determine an appropriate bid based on its own requirements (e.g., budget, targets in placements) and submit a bid response including a bid price and an identifier of a creative to be served, for example, to the transaction manager 112 (or not to respond at all). The transaction manager 112 determines a winning bid (e.g., a highest bid) among bid responses received within a specified time period (e.g., 100 milliseconds). The transaction manager 112 then returns a creative of the winning bid to the client device 120, causing the application 125 to present the creative in the ad space in the user interface 124. The transaction manager 112 can also return a URL for a creative of the winning bid to the client device 120, causing the application 125 on the client device 120 to retrieve the creative from an ad server (e.g., ad server 114, or ad servers 127 external to the server system 122), or from servers of a content distribution network (CDN) 131.

In various implementations, the transaction manager 112 can store in the transaction data database 134 transaction information for the winning bid in a transaction record, for example. Transaction information can include an identifier of the creative served to the ad space, an identifier of the winning buyer, the user's identifier, the winning bid price, an identifier of the ad space, an identifier of the seller of the ad space, and a time stamp. Other transaction information of a transaction is possible. The winning bid price (i.e., the price paid by the winning buyer) can be the bid price submitted by the winning buyer, or a second highest bid price of the auction as determined by Vickrey auction or other second-price auction mechanisms.

If the winning bid is a cost-per-impression bid, the winning bid's buyer pays the seller when the buyer's creative is served to the ad space. The transaction manager 112 can store in the transaction database 134 a transaction record for the winning bid after receiving a confirmation that the buyer's creative is served to the ad space 126. For instance, the transaction manager 112 can received the confirmation from the application 125. The transaction manager 112 can also receive the confirmation from a server system (e.g., ad server 114, ad server 127, or CDN 131) that sent the creative to the client device 120.

If the winning bid is a cost-per-impression bid, the winning bid's buyer pays the seller only if the buyer's creative presented in the ad space 126 is viewed on the client device 120. The transaction manager 112 can store in the transaction database 134 a transaction record for the winning bid after receiving a confirmation that the buyer's creative presented in the ad space 126 is viewed on the client device 120. In various implementations, the transaction manager 112 can receive the confirmation from the client device 120. For instance, the application 125 or a tracking code included with the creative (when processed by the application 125) can determine that the ad space 126 (including the creative) is in view in the user interface 124, and send a confirmation (e.g., by making a server call-back using HTTP POST) to the transaction manager 112. The ad space 126 (or another element of the electronic document being presented in the user interface 124) is in view in the user interface 124 if the ad space 126 is within a visible area (e.g., a viewport) of the user interface 124.

A confirmation of viewing of the creative can be based on complete or partial viewing of the creative. For instance, the application 125 (or the tracking code) can determine an element (e.g., HTML DIV or LI element) at a particular location (e.g., at upper one-fourth) of the ad space 126 (including the creative) is in view in the user interface 124. The application 125 can determine whether a bounding box of the element is within the current viewport of the user interface 124. As for another example, the application 125 can analyze changes in a Document Object Model (DOM) tree structure used by the user interface 124 to determine whether a bounding box of the ad space 126 (including the creative) is completely or partially within the current viewport of the user interface 124. By way of illustration, the application 125 can calculate a bounding box of the ad space 126 (or an element within the ad space 126) by using JavaScript code with getBoundingClientRect method. In this way, the application 125 can determine whether the creative has been viewed, entirely or partially, and send a confirmation to the transaction manager 112.

A confirmation of viewing of the creative can also be based on a specified time period that viewing of the creative has occurred. For instance, the application 125 (or the tracking code) can sends a confirmation of viewing to the transaction manager 112, after determining that the creative has been in view in the user interface 124 for at least a specified period of time.

The buyer (or the seller) can specify (e.g., via a web page or API provided by the server system 122) one or more criteria for viewing of the creative. For instance, the buyer can specify that a creative has to be viewed by 50% of area (or pixels) for at least 3 seconds to be considered as a successful viewing event. The transaction 112 stores a transaction record in the transaction manager 112 only after receiving from the client device 120 (e.g., from the application 125) a confirmation confirming that 50% of the creative has been in view in the user interface 124 for 3 seconds.

A seller of an ad space (e.g., the ad space 126) can accept a cost-per-impression bid or a cost-per-view bid on an auction of the ad space. However, by accepting a cost-per-view bid, the seller of the ad space takes on a risk that the ad space including a creative for the cost-per-bid is not viewed on the client device 120. If the creative for the cost-per-view bid is not viewed on the client device 120, the seller does not receive payment from the cost-per-view bid's buyer. That is, the seller comes away from the auction of the ad space empty handed. Furthermore, the seller of the ad space may lose an opportunity of accepting a cost-per-impression bid from another buyer and receive payment from the other buyer after the other buyer's creative (for the cost-per-impression bid) is served to the ad space.

Particular implementations of the subject matter described in this specification describe methods for supporting cost-per-view bids and cost-per-impression bids in a single auction of an ad space. Particular implementations select a cost-per-view bid and a cost-per-impression bid on the ad space, and deliver respective creatives of the two selected bids to the ad space. As further described below in reference to FIG. 2, particular implementations provide a mechanism that if the creative of the selected cost-per-view bid is served in the ad space but the ad space is not viewed, the creative for the selected cost-per-impression bid is then served in the ad space. In this way, the ad space's seller can receive payment, either from the buyer of the selected cost-per-view bid, or from the buyer of the selected cost-per-impression bid.

Figure 2:
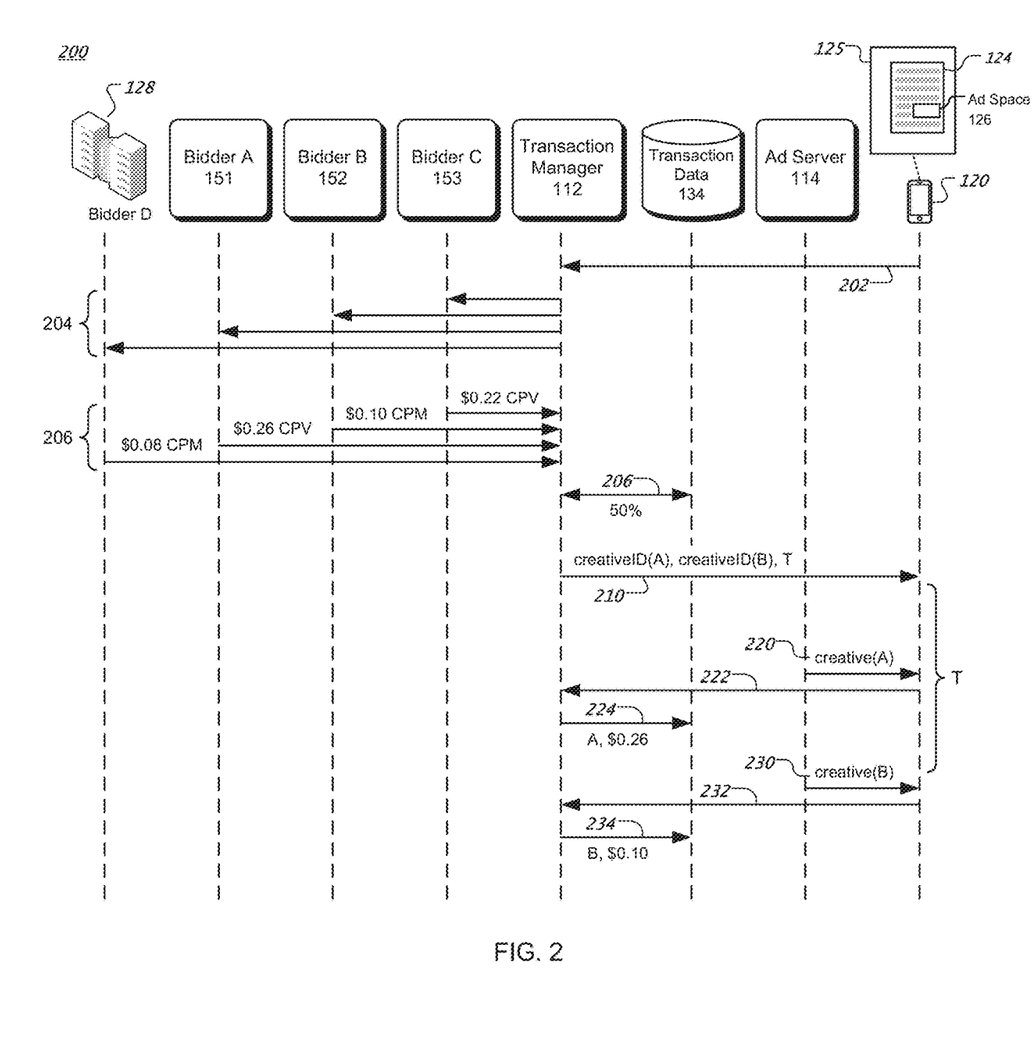
FIG. 2 is a data flow diagram of an example method for supporting cost-per-view and cost-per-impression bids in an auction of an ad space.

FIG. 2 is a data flow diagram of an example method for supporting cost-per-view and cost-per-impression bids in an auction of an ad space. In FIG. 2, the transaction manager 112 receives an ad request (202) for an ad space 126 that is for presentation in the user interface 124. As described earlier, the ad request 202 can be sent by the application 126 when processing an ad tag (e.g., with JavaScript code) of the ad space 126. In various implementations, the application 125 can include a software library (e.g., a software development kit) that, when processed by the application 125, causes the application 125 to send the ad request 202 when presenting the user interface 124 including the ad space 126.

In response to the ad request 202, the transaction manager 112 sends to multiple bidders a bid request (204) requesting a bid on the ad space 126. The bid request 204 includes an identifier of the ad space 126 and a size of the ad space 126, for example. The bid request 204 can be composed in JSON format and transmitted to bidders using HTTP POST, as described earlier.

By way of illustration, the transaction manager 112 receives respective bids (in response to the bid request 204) from the bidder A, bidder B, bidder C, and bidder C (206). Each bid includes a bid price and a flag indicating a bid type (e.g., cost-per-impression or CPM, cost-per-view or CPV), an identifier of a buyer, and an identifier of a creative from the buyer. Here, assume that bidder A (e.g., representing buyer A) submits a cost-per-view bid with a bid price of $0.26. Bidder B (e.g., representing buyer B) submits a cost-per-impression bid with a bid price of $0.10. Bidder C (e.g., representing buyer C) submits a cost-per-view bid with a bid price of $0.22. Bidder D (e.g., representing buyer D) submits a cost-per-impression bid with a bid price of $0.08.

In various implementations, a cost-per-view bid's bid price is adjusted to take into account a probability that the cost-per-view bid's creative, when served to the ad space 126, will not be viewed. For instance, the transaction manager 112 can identifies a received bid being a cost-per-view bid based on the bid's bid type, and adjust the cost-per-view bid's bid price based on a historical viewing rate of an ad space inventory including the ad space 126. The transaction manager 112 can determine a historical viewing rate by accessing transaction data database 134 for transaction records on the ad space inventory (206). The transaction manager 112 determines a number of creatives that were served to ad spaces of the ad space inventory (e.g., over the past three days), and among the served creatives a number of creatives that were also viewed. The transaction manager 112 determines a historical viewing rate (for the ad space inventory) as the ratio of the number of viewed creatives to the number of served creatives, for example.

By way of illustration, assume that a historical viewing rate for the ad space inventory including the ad space 126 is 50%. The transaction manager 112 can adjust a cost-per-view bid's bid price by multiplying the bid price by the historical viewing rate. For instance, the transaction manager 112 adjusts buyer A's cost-per-view bid's bid price from $0.26 to $0.13. The transaction manager 112 adjusts buyer C's cost-per-view bid's bid price from $0.22 to $0.11.

The transaction manager 112 compares the received cost-per-impression bid prices ($0.10 from buyer B, and $0.08 from buyer D) and the cost-per-view bid prices as adjusted ($0.13 from buyer A, and $0.11 from buyer C), and selects a winning bid that has the highest bid price. The transaction manager 112 selects the bid from buyer A which adjusted cost-per-view bid price of $0.13 is the highest bid price among the received bids. The transaction manager 112 also selects the bid from buyer B which cost-per-impression bid price in $0.10 is the highest among the received cost-per-impression bids. As will be further described below, buyer B's cost-per-impression bid acts as a "backup" for buyer A's cost-per-view bid, in case buyer A's creative presented in the ad space 126 is not viewed on the client device 120. The next highest cost-per-view bid (adjusted bid price $0.11) from buyer C is not selected as a backup for buyer A's cost-per-view bid, even that its adjusted bid price $0.11 is higher than buyer B's $0.10 bid price. Buyer C's cost-per-view bid is not selected as a backup for buyer A's cost-per-view bid since buyer C's creative, if presented in the same ad space 126, is not likely to be viewed on the client device 120, either.

After selecting the buyer A's cost-per-view bid and buyer B's cost-per-impression bid, the transaction manager 112 sends a message to the client device 120 (210). The message (e.g., composed in JSON format) includes an identifier for a creative from buyer A, an identifier for a creative from buyer B, and a flag indicating that the creative from buyer A is for a cost-per-view bid and the creative from buyer B is for a cost-per-impression bid. The message also specifies a time period T (e.g., 5 seconds) during which a creative for a cost-per-view bid (e.g., the bid from buyer A) is presented in the ad space 126, as will be described in detail below. Note that the specified time period T can be configured by the seller or buyer (e.g., buyer A) of the ad space 126 (e.g., by using an API or web page provided by the server system 122).

After receiving the message, the application 125 (e.g., by processing the ad tag or software library described earlier) determines whether the ad space 126 is in view on the client device 120 within the specified time period T. If the ad space 126 is in view on the client device 120 within the specified time period T, e.g., when the application 125 is ready to render in the user interface 124 content surrounding and including the ad space 126, the application 125 obtains buyer A's creative (based on the identifier of the creative) from the ad server 114 (220) and presents buyer A's creative in the ad space 126. The application 125 also sends to the transaction manager 112 a confirmation (e.g., composed in JSON format) that the creative from buyer A was presented (and viewed) in the ad space 126 within the specified time period T (222). Based on the confirmation, the transaction manager 112 stores in the transaction data database 134 a transaction record including the seller of the ad space 126, an identifier of the ad space 126, buyer A, and the cost-per-view bid price $0.26 (before adjustment) from buyer A (224). In this way, the seller of the ad space 126 can receive payment from buyer A based on the transaction record. In some implementations, a second-highest bid price can be recorded in the transaction record as the payment to be paid by buyer A. A second-highest bid price can be adjusted by the historical viewing rate described earlier if the second-highest bid price is a cost-per-view bid price. For instance, a second-highest bid price can be $0.11 cost-per-view bid price as adjusted from buyer C. If a second-highest bid prices is a cost-per-impression bid, the cost-per-impression bid price can be recorded in the transaction record as the payment to be paid by buyer A. An additional fee (e.g., $0.01) can be added to the payment to be paid by buyer A. In various implementations, the payment to be paid by buyer A can be no lower than a floor price set by the seller of the ad space 126.

If the ad space 126 is not in view on the client device 120 within the specified time period T, the application 125 obtains buyer B's creative (based on the identifier of the creative) from the ad server 114 (230) and present Buyer B's creative in the ad space 126. The application 125 also sends to the transaction manager 112 a confirmation (e.g., composed in JSON format) that the creative from buyer B was presented in the ad space 126 (232). Based on the confirmation, the transaction manager 112 stores in the transaction data database 134 a transaction record including the seller of the ad space 126, an identifier of the ad space 126, buyer B, and the cost-per-impression bid price $0.10 from buyer B (234). In this way, buyer B's creative is a backup for buyer A's creative when buyer A's creative is not viewed within the specified time period T. The seller of the ad space 126 can receive payment from buyer B, without taking a risk of accepting buyer A's cost-per-view bid but not being able to receive payment from buyer A.

If the highest bid price among bids received by the transaction manager 112 is of a cost-per-impression bid, the transaction manager 112 selects the cost-per-impression bid and sends a creative identifier of the selected cost-per-impression bid to the client device 120 to be presented in the ad space 126. In this case, the transaction manager 112 does not need to send a backup creative from another bid, since the seller of the ad space 126 can receive payments from the selected cost-per-impression bid's buyer when the corresponding creative is served to the ad space 126.

Figure 3:
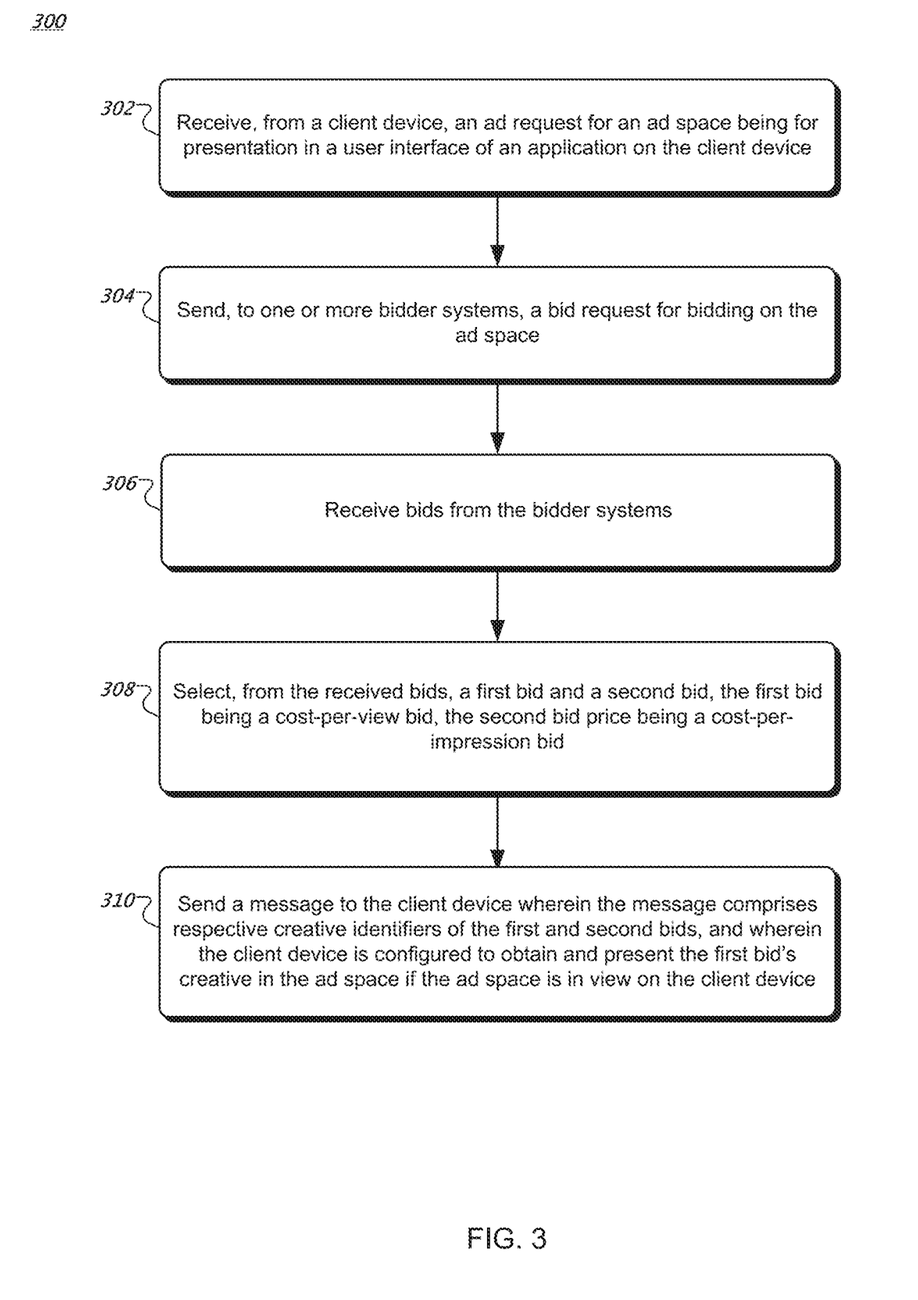
FIG. 3 is a flowchart of another example method for supporting cost-per-view and cost-per-impression bids in an auction of an ad space.

FIG. 3 is a flowchart of another example method for supporting cost-per-view and cost-per-impression bids in an auction of an ad space. The method can be implemented using the transaction manager 112 and the application 125, for example. The method begins by receiving, from a client device, an ad request for an ad space being for presentation in a user interface of an application on the client device (Step 302; transaction manager 112). The method sends, to one or more bidder systems, a bid request for bidding on the ad space (Step 304; transaction manager 112). The method receives bids from the bidder systems, each bid corresponding to a respective buyer, a respective creative, and a respective bid price (Step 306; transaction manager 112). The method selects, from the received bids, a first bid and a second bid, the first bid corresponding to a first buyer, a first bid price, and a first creative, the first bid price being a cost-per-view bid wherein the first buyer pays only if the first creative is viewed, the second bid corresponding to a second buyer, a second bid price, and a second creative, the second bid price being a cost-per-impression bid wherein the second buyer pays if the second creative is served (Step 308; transaction manager 112). The method sends a message to the client device wherein the message comprises respective identifiers of the first and second creatives (e.g., transaction manager 112), and wherein the client device (e.g., application 125) is configured to obtain the first creative and present the first creative in the ad space if the ad space is in view on the client device within a specified time period (Step 310).

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:

receiving, by a processing system including a processor, an ad request for a particular ad space being for presentation in a user interface of an application on a client device;

sending, by the processing system to one or more bidder systems, a bid request for bidding on the particular ad space;

receiving, by the processing system and responsive to the bid request, bids from the bidder systems to obtain a plurality of received bids comprising a group of cost-per-view bids and a group of cost-per-impression bids, each bid of the plurality of received bids corresponding to a respective buyer, a respective creative, and a respective bid price, wherein it is unknown to the processing system whether the particular ad space is in view on the client device at a time of receiving the bids;

responsive to a bid corresponding to a creative from the group of cost-per-impression bids exceeding all bids from the group of cost-per-view bids:

sending, by the processing system, a message to the client device comprising an ad tag comprising an identifier of the creative for presentation in the particular ad space according to the bid; and responsive to group of cost-per-impression bids not exceeding all bids from the group of cost-per-view bids:

selecting, by the processing system from the plurality of received bids, a first bid from the group of cost-per-view bids and a distinct second bid from the group of cost-per-impression bids, the first bid corresponding to a first buyer, a first bid price, and a first creative, the first bid being a cost-per-view bid wherein the first buyer pays responsive to the first creative is viewed within the particular ad space, the distinct second bid corresponding to a second buyer, a second bid price, and a second creative, the distinct second bid being a cost-per-impression bid wherein the second buyer pays responsive to the second creative is served for presentation within the particular ad space regardless of whether the second creative is viewed, wherein the receiving and selecting comprise a single auction of the particular ad space, wherein the single auction is concluded prior to a determination whether the particular ad space is in view on the client device, wherein the first buyer and the second buyer are identified based on the single auction, prior to the determination and the single auction is concluded prior to the determination, wherein payment for the particular ad space is received from one of the first buyer and the second buyer; and sending, by the processing system, a single message to the client device wherein the single message comprises a specified time period, a first ad tag comprising a first identifier of the first creative and a second ad tag comprising a second, different identifier of the second creative, wherein the client device, responsive to receiving the single message to obtain a received message:
determines that the specified time period has expired;
determines that the particular ad space has not been in view on the client device within the specified time period; and
responsive to the particular ad space not having been in view on the client device within the specified time period, uses the second, different identifier in the received message to obtain the second creative for presentation in the particular ad space according to the cost-per-impression bid.

2. The method of claim 1, further comprising:
receiving, by the processing system and from the client device, a first confirmation that the first creative was presented in the particular ad space; and
recording, by the processing system, a first transaction amount payable by the first buyer, the first transaction amount being based on the first bid price.

3. The method of claim 1, further comprising:
receiving, by the processing system and from the client device, a second confirmation that the second creative was presented in the particular ad space; and
recording, by the processing system, a second transaction amount payable by the second buyer, the second transaction amount being based on the second bid price.

4. The method of claim 1, wherein the determination whether the particular ad space is in view on the client device further comprises determining whether a specified area of the particular ad space is viewed, the specified area being configurable by one of a seller and/or a buyer of the particular ad space.

5. The method of claim 1, further comprising:
determining, by the processing system, a probability that a creative when served to the particular ad space responsive to the cost-per-view bid, will not be viewed, wherein the first bid price is adjusted to take into account the probability.

6. The method of claim 1, wherein the specified time period is configurable by one of a seller of the particular ad space or a buyer of the particular ad space.

7. The method of claim 1, wherein the payment for the particular ad space is determined according to a second highest bid price.

8. A system comprising:
a processing system including a processor; and
a memory that stores executable instructions that, when executed by the processing system, facilitate performance of operations comprising:

receiving an ad request for a single ad space being for presentation in a user interface of an application on a client device;

sending, to one or more bidder systems, a bid request for bidding on the single ad space;

receiving, responsive to the bid request, bids from the bidder systems to obtain a plurality of received bids comprising a group of cost-per-view bids and a group of cost-per-impression bids, each bid of the plurality of received bids corresponding to a respective buyer, a respective creative, and a respective bid price, wherein it is unknown to the processing system whether the single ad space is in view on the client device at a time of receiving the bids;

responsive to a bid corresponding to a creative from the group of cost-per-impression bids exceeding all bids from the group of cost-per-view bids:
sending a message to the client device comprising an ad tag comprising an identifier of the creative for presentation in the single ad space according to the bid; and responsive to group of cost-per-impression bids not exceeding all bids from the group of cost-per-view bids:
selecting, from the plurality of received bids, a first bid from the group of cost-per-view bids and a distinct second bid from the group of cost-per-impression bids, the first bid corresponding to a first buyer, a first bid price, and a first creative, the first bid being a cost-per-view bid wherein the first buyer pays responsive to the first creative is viewed, the distinct second bid corresponding to a second buyer, a second bid price, and a second creative, the distinct second bid being a cost-per-impression bid wherein the second buyer pays responsive to the second creative is served regardless of whether the second creative is viewed, wherein the receiving and selecting comprise a single auction of the single ad space, wherein the single auction is concluded prior to a determination whether the single ad space is in view on the client device, wherein the first buyer and the second buyer are identified based on the single auction prior to the determination and the single auction is concluded prior to the determination, wherein payment for the single ad space is received from one of the first buyer and the second buyer; and
sending a single message to the client device wherein the single message comprises a specified time period, a first ad tag comprising a first identifier of the first creative and a second ad tag comprising a second, different identifier of the second creative, wherein the first identifier facilitates the client device obtaining the first creative for presentation in the single ad space,
wherein the client device, responsive to receiving the single message resulting in a received message:
determines that the specified time period has expired;
determines that the single ad space has not been in view on the client device within the specified time period; and
to the single ad space not having been in view on the client device within the specified time period, uses the second, different identifier in the received message to obtain the second creative for presentation in the single ad space according to the cost-per-impression bid.

9. The system of claim 8 wherein the operations further comprise:
receiving, from the client device, a first confirmation that the first creative was presented in the single ad space; and
recording a first transaction amount payable by the first buyer, the first transaction amount being based on the first bid price.

10. The system of claim 8 wherein the operations further comprise:
receiving, from the client device, a second confirmation that the second creative was presented in the single ad space; and
recording a second transaction amount payable by the second buyer, the second transaction amount being based on the second bid price.

11. The system of claim 8, wherein the determination whether the single ad space is in view on the client device further comprises determining whether a specified area of the single ad space is viewed, the specified area being configurable by one of a seller and/or a buyer of the single ad space.

12. The system of claim 8, wherein the operations further comprise:
determining, by the processing system, a probability that a creative when served to the single ad space responsive to the cost-per-view bid, will not be viewed, wherein the first bid price is adjusted to take into account the probability.

13. The system of claim 8, wherein the specified time period is configurable by one of a seller of the single ad space or a buyer of the single ad space.

14. The system of claim 8, wherein the payment for the single ad space is determined according to a second highest bid price.

15. A storage device having instructions stored thereon that, when executed by a processing system including a processor, facilitate performance of operations comprising:
receiving an ad request for an ad space being for presentation in a user interface of an application on a client device;
sending, to one or more bidder systems, a bid request for bidding on the same ad space;
receiving bids from the bidder systems to obtain received bids, each bid corresponding to a respective buyer, a respective creative, and a respective bid price, wherein it is unknown to the processing system whether the ad space is in view on the client device at a time of receiving the bids;
responsive to a bid, corresponding to a creative, from a group of cost-per-impression bids exceeding all bids from a group of cost-per-view bids:
sending a message to the client device comprising an ad tag comprising an identifier of the creative for presentation in the ad space according to the bid; and
responsive to the group of cost-per-impression bids not exceeding all bids from the group of cost-per-view bids:
selecting, from the received bids, a first bid and a distinct second bid, the first bid corresponding to a first buyer, a first bid price, and a first creative, the first bid being a cost-per-view bid wherein the first buyer pays responsive to the first creative is viewed, the distinct second bid corresponding to a second buyer, a second bid price, and a second creative, the distinct second bid being a cost-per-impression bid wherein the second buyer pays responsive to the second creative is served regardless of whether the second creative is viewed, wherein the receiving and selecting comprise a single auction of the same ad space, wherein the single auction is concluded prior to a determination whether the ad space is in view on the client device, wherein the first buyer and the second buyer are identified based on the single auction prior to the determination and the single auction is concluded prior to the determination, wherein payment for the same ad space is received from one of the first buyer and the second buyer; and
sending a single message to the client device wherein the single message comprises a specified time period, a first ad tag comprising a first identifier of the first creative and a second ad tag comprising a second, different identifier of the second creative, wherein the first identifier facilitates the client device obtaining the first creative for presentation in the ad space;
wherein the client device, responsive to receiving the single message to obtain a received message:
determines that the specified time period has expired;
determines that the ad space has not been in view on the client device within the specified time period; and
responsive to the ad space not having been in view on the client device within the specified time period, uses the second, different identifier in the received message to obtain the second creative for presentation in the same ad space according to the cost-per-impression bid.

16. The storage device of claim 15 wherein the operations further comprise:
receiving, from the client device, a first confirmation that the first creative was presented in the ad space; and
recording a first transaction amount payable by the first buyer, the first transaction amount being based on the first bid price.

17. The storage device of claim 15 wherein the operations further comprise:
receiving, from the client device, a second confirmation that the second creative was presented in the ad space; and
recording a second transaction amount payable by the second buyer, the second transaction amount being based on the second bid price.

18. The storage device of claim 15, wherein the operations further comprise:
determining, by the processing system, a probability that a creative when served to the ad space responsive to the cost-per-view bid, will not be viewed, wherein the first bid price is adjusted to take into account the probability.

19. The storage device of claim 15, wherein the specified time period is configurable by one of a seller of the ad space or a buyer of the ad space.

20. The storage device of claim 15, wherein the payment for the ad space is determined according to a second highest bid price.

* * * * *